United States Patent [19]

Shirato et al.

[11] 4,317,124

[45] Feb. 23, 1982

[54] INK JET RECORDING APPARATUS

[75] Inventors: Yoshiaki Shirato, Yokohama; Yasushi Takatori, Sagamihara; Toshitami Hara, Tokyo; Yukuo Nishimura, Sagamihara; Michiko Takahashi, Ohizumi, all of Japan

[73] Assignee: Canon Kabushiki Kaisha, Tokyo, Japan

[21] Appl. No.: 117,487

[22] Filed: Feb. 1, 1980

[30] Foreign Application Priority Data

| | | | |
|---|---|---|---|
| Feb. 14, 1979 | [JP] | Japan | 54-15706 |
| Feb. 16, 1979 | [JP] | Japan | 54-16953 |
| Feb. 19, 1979 | [JP] | Japan | 54-18797 |
| Feb. 19, 1979 | [JP] | Japan | 54-18798 |

[51] Int. Cl.[3] .................. G01D 15/18

[52] U.S. Cl. .................. 346/140 R

[58] Field of Search .................. 346/140 PD

[56] References Cited

U.S. PATENT DOCUMENTS

| | | | |
|---|---|---|---|
| 4,164,745 | 8/1979 | Cielo et al. | 346/140 PD |
| 4,223,324 | 9/1980 | Yamamori et al. | 346/140 PD |

*Primary Examiner*—George H. Miller, Jr.
*Attorney, Agent, or Firm*—Fitzpatrick, Cella, Harper & Scinto

[57] ABSTRACT

An ink jet recording apparatus for ejecting a recording liquid in the form of droplets from an orifice connecting to a chamber containing said liquid and depositing at least of said droplets onto a recording material to perform recording, comprising a liquid intake means in the vicinity of said orifice.

16 Claims, 29 Drawing Figures

INK JET RECORDING APPARATUS

BACKGROUND OF THE INVENTION

1. Field of the Invention

The present invention relates to an ink jet recording apparatus, and more particularly to a structure of the ink jet recording apparatus in which a recording liquid, generally called "ink", is ejected in the form of droplets from orifices connecting to a chamber containing said ink and at least a part of said droplets is deposited onto a recording material to perform desired recording.

Among the non-impact recording systems recently attracting attention because of negligibly low noise generation at the recording operation in contrast to the impact recording systems as exemplified by the typewriter, the ink jet recording method is recognized as particularly promising because of the possibility of high-speed recording on plain paper without any particular fixing step. In the field of ink jet recording there have been proposed various systems, some of which have been developed to commerical use while some others are still in the course of technical improvement.

In general the ink jet recording method performs the recording by ejecting droplets of a recording liquid, called ink, from minute orifices and depositing said droplets onto a recording material, and can be classified into several systems according to the method of generating such droplets and the method of controlling the flight direction of thus generated droplets.

2. Description of the Prior Art

In the following briefly explained are the representative systems of the ink jet recording.

A first system, called Teletype system disclosed in the U.S. Pat. No. 3,060,429, utilizes electrostatic attraction for generating a liquid flow which is directly deposited onto the recording material or of which flight direction is controlled by an electric field thereby causing deposition of liquid droplets onto the recording material.

A second system, such as for example Sweet system disclosed in the U.S. Pat. No. 3,596,275, and Lewis and Brown system proposed in the U.S. Pat. No. 3,298,030, utilizes a continuous vibration method to generate a flow of liquid droplets of a controlled charge, which are made to fly across a uniform electric field applied between deflecting electrodes to perform recording on the recording material.

A third system, such as for example Hertz system disclosed in the U.S. Pat. No. 3,416,153, utilizes a continuous vibration method to form and atomize liquid droplets in an electric field applied between the nozzle and annular charging electrode. In this system the strength of said electric field is modulated according to the recording signal, whereby the atomization of the droplets are controlled to obtain a tonal rendition in the recorded image.

A fourth system, such as for example Stemme system disclosed in the U.S. Pat. No. 3,747,120, is basically different form the foregoing three systems in that a piezo-vibration element provided in a recording head having a recording liquid-ejecting orifice converts electric recording signals into mechanical vibration, whereby the droplets are ejected from the orifice when needed and deposited on the recording material to perform the recording.

In addition to the foregoing, there was proposed another novel ink jet recording system which, as disclosed in the preceding Japanese Patent Application Sho No. 52-118798 (corresponding to U.S. Ser. No. 948,236 Oct. 3, 1978) of the present applicant, is different in basic principle from the aforementioned four systems. In summary said novel system is based on applying a thermal signal to the recording liquid introduced in a liquid chamber to eject said liquid in the form of droplets from an orifice connected to said liquid chamber in accordance with a force caused by the state change of said liquid and depositing said droplets onto the recording material to perform recording.

The major technical problems encountered in the foregoing ink jet recording systems can be summarized in the following four points.

The first of such problems is to achieve droplet ejection with secure response even to a high-frequency input signal and to continuously form droplets of a substantially uniform size, in order to prevent omissions or quality deterioration in the printing at the time of the high-speed recording.

The second is to achieve and maintain stable ejection of droplets within a short period when the recording operation is restarted after a pause, thus assuring high-quality recording without omission or aberration in the printing immediately from the start of a recording operation.

The third is to prevent eventual clogging, by the impurities present in the ink or by the dried ink, of the very minute ink-ejection orifices used in the ink jet recording apparatus. The solution to this problem is essential in the ink jet recording as the apparatus is disabled entirely by such clogging.

The fourth is to prevent, in case of a multiple orifice apparatus, collision or fusion of neighboring droplets during the flight thereof. In a multi-orifice system wherein plural orifices are arranged with a high density, for example 8 to 16 orifices per millimeter, plural neighboring ink droplets tend to collide and fuse together during the flight, thus resulting in unevenly sized droplets or distorted deposition on the recording material, thus deteriorating the printing.

In the field of ink jet recording there has not been proposed a technology capable of completely solving all the foregoing technical problems.

SUMMARY OF THE INVENTION

The principal object of the present invention, therefore, is to completely eleminate the aforementioned technical problems which remain unsolved in the prior art, and, more specifically, to provide an ink jet recording apparatus adapted for high-speed recording without causing omissions in the printing or deterioration in the print quality.

Another object of the present invention is to provide an ink jet recording apparatus wherein stable ejection of recording droplets can be obtained within an extremely short time.

Still another object of the present invention is to provide an ink jet recording apparatus allowing easy maintenance.

According to the present invention, there is provided an ink jet recording apparatus adapted for ejecting a recording liquid in the form of droplets from an orifice connecting to a chamber containing said liquid and depositing at least a part of said droplets onto a recording material to perform recording, comprising a liquid intake means in the vicinity of said orifice.

DESCRIPTION OF THE PREFERRED EMBODIMENTS

The present invention will now be clarified in detail by the following description of the embodiments thereof to be taken in conjunction with the attached drawings.

Figure 1:
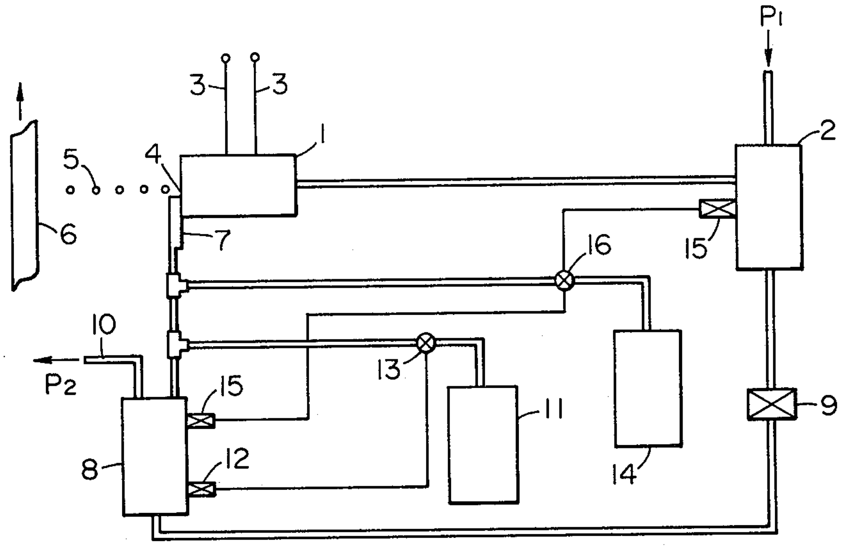
FIG. 1 is a schematic view of a recording apparatus embodying the present invention.

At first reference is made to FIG. 1 showing the basic structure of the present invention, the ink supplied from an ink supply tank 2 with a determined pressure $P_1$ is furnished with energy in an energizing unit 1 by suitable input means 3 according to the information signal and ejected in the form of droplets 5 from an orifice 4 connected to said energizing unit 1 and further deposited onto a recording material 6 thereby performing the recording. The above-mentioned pressure $P_1$ is so selected as to cause rapid refill of the ink in said energizing unit and to improve the ejection response to the input signal, whereby the ink spontaneously leaks from said orifice even in the absence of the input signal.

Consequently in the vicinity of said orifice 4 there is formed a liquid film by the leaking ink, leading to unstable size of ink droplet and rendering the direction and speed of the ink droplet unstable. In addition, during the pause of the apparatus between the recording operations said ink staying in the vicinity of the orifice 4 is dried to clog said orifice 4, thus hindering the re-start of the droplet emission.

In the present embodiment, therefore, there is provided a liquid intake unit 7 in the vicinity of said orifice 4 to remove such staying ink.

Said ink intake unit 7 is constantly maintained under a lower pressure than at the orifice 4, whereby the ink is sucked together with the atmosphere around said orifice into said intake unit 7. The sucked ink need not be reused but is usually recovered in an ink recovery tank 8 and returned to the ink supply tank 2 through a filter 9 for reuse as shown in FIG. 1, in order to prevent the waste of the ink. The ink recovery tank 8 is provided with a suction pipe 10 for generating a negative pressure $P_2$ for causing the intake unit 7 to perform the function thereof, but said pipe need not necessarily be mounted directly on the ink recovery tank 8 as long as the above-mentioned object is achieved.

The energizing unit 1 is provided with a signal generating means, for example, a piezo-electric element or a thermal element.

There is also provided a solvent supply tank 11. During the course of displacement from the ejection from the orifice 4 to the suction by the intake unit 7 the ink is subjected to the evaporation of solvent, thus resulting in a higher concentration and a higher viscosity. Such concentrated ink shows deteriorated ejection characteristic and may result in the orifice clogging in case of reuse due to the increased solid content therein. Consequently the ink is preferably returned to the original concentration by solvent addition from said tank 11 through a solvent supply valve 13 in response to the signal from an ink concentration sensor 12.

Also the amount of ink in the ink supply tank 2 and in the ink recovery tank 8 is preferably regulated constantly by replenishment from an ink replenishing tank 14 in response to the ink consumption. Said regulation is achieved by an ink replenishing valve 16 controlled by the signal from detector 15 for ink amount.

Figure 2:
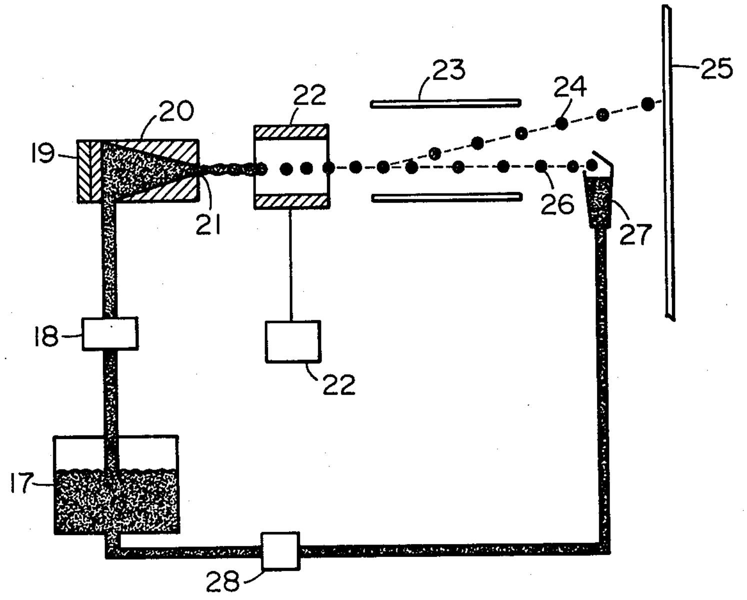
FIG. 2 PRIOR ART
FIGS. 2 and 3 are schematic views of conventional apparatus.

In comparison with the foregoing embodiment, there is shown, in FIG. 2, a conventional ink jet recording apparatus in which ink supplied from an ink supply tank 17 under a pressure by a pump 18 is subjected to oscillation by a piezoelectric element and is ejected from an orifice 21. Upon separation from the ejected ink flow, the droplet is electrostatically charged by charger 22 according to the information signal, and the trajectories of ink droplets are separated by deflecting plates 23 according to the input signal whereby the droplets 24 corresponding to the recording signal being deposited onto a recording material 25, while other droplets 26 not in response to said signal are collected by a gutter 27. As will be apparent from the foregoing explanation, the function of the liquid intake means in the present invention is basically different from that of the gutter 27 shown in FIG. 2. More specifically, while said gutter 27 functions only to recover the droplets not utilized in the recording, the liquid intake unit 7 shown in FIG. 1 contributes to stabilize the ink ejection from the orifice 4 by realizing uniform wetting conditions of the ink around said orifice 4.

Figure 3:
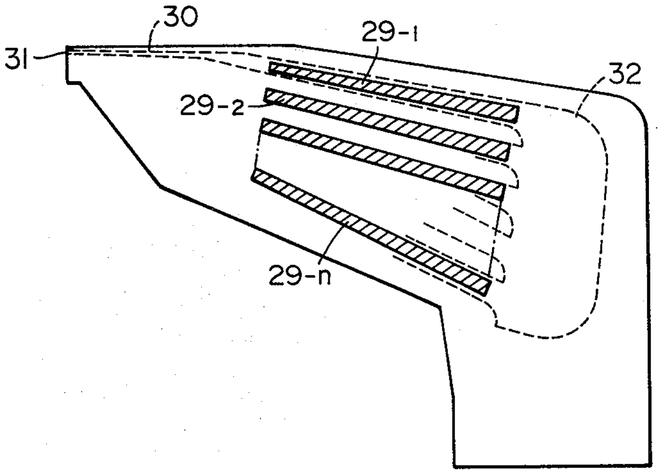
FIG. 3 PRIOR ART

FIG. 3 shows another known ink jet recording apparatus as disclosed in the Japanese Patents Laid-Open Sho No. 52-150636 and Sho 52-150637 (both corresponding to U.S. Ser. No. 694,064 filed June 7, 1976), wherein the ink droplets are ejected through an ink groove 30 and an orifice 31 by the mechanical vibration of piezoelectric elements 29-1, 29-2, . . . , 29-n in response to the recording signal thereby performing recording on a recording material (not shown). In such apparatus a common ink reservoir 32 is provided with a pressure sensor and a vernier pressure regulator (both not shown) to obtain stable droplet generation. Although such pressure regulation is extremely difficult in practice, it is possible, by the use of a liquid intake mechanism in the vicinity of said orifice 31, to obtain stable droplet ejection without such precise regulation of pressure, by simply applying a pressure exceeding a determined value to the common ink reservoir 32.

Figure 4:
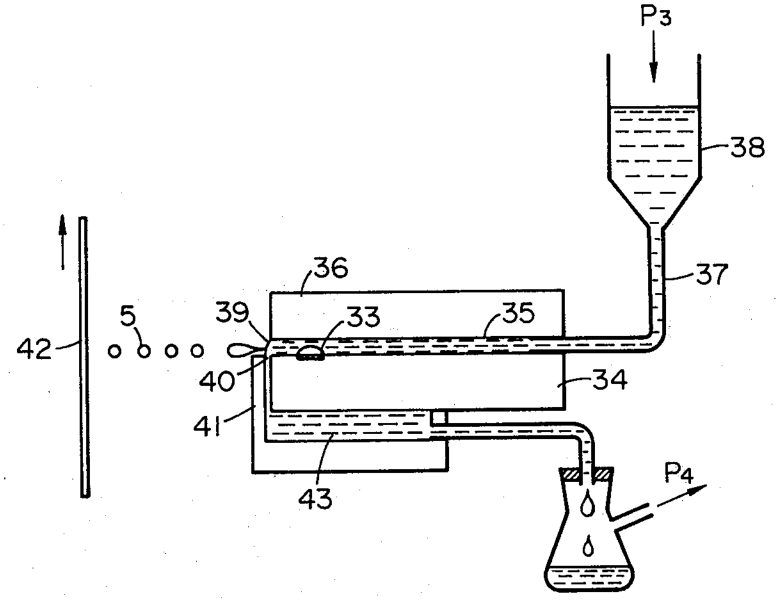
FIGS. 4 to 12 are schematic views showing other embodiments of the present invention.
Figure 5:
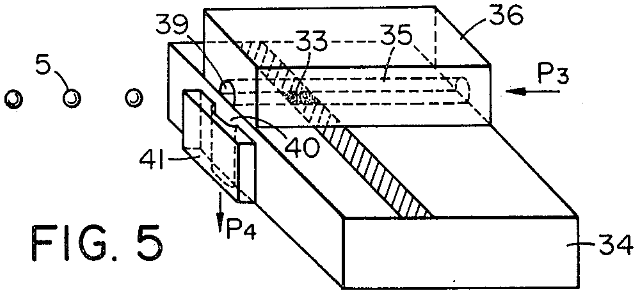
Figure 6:
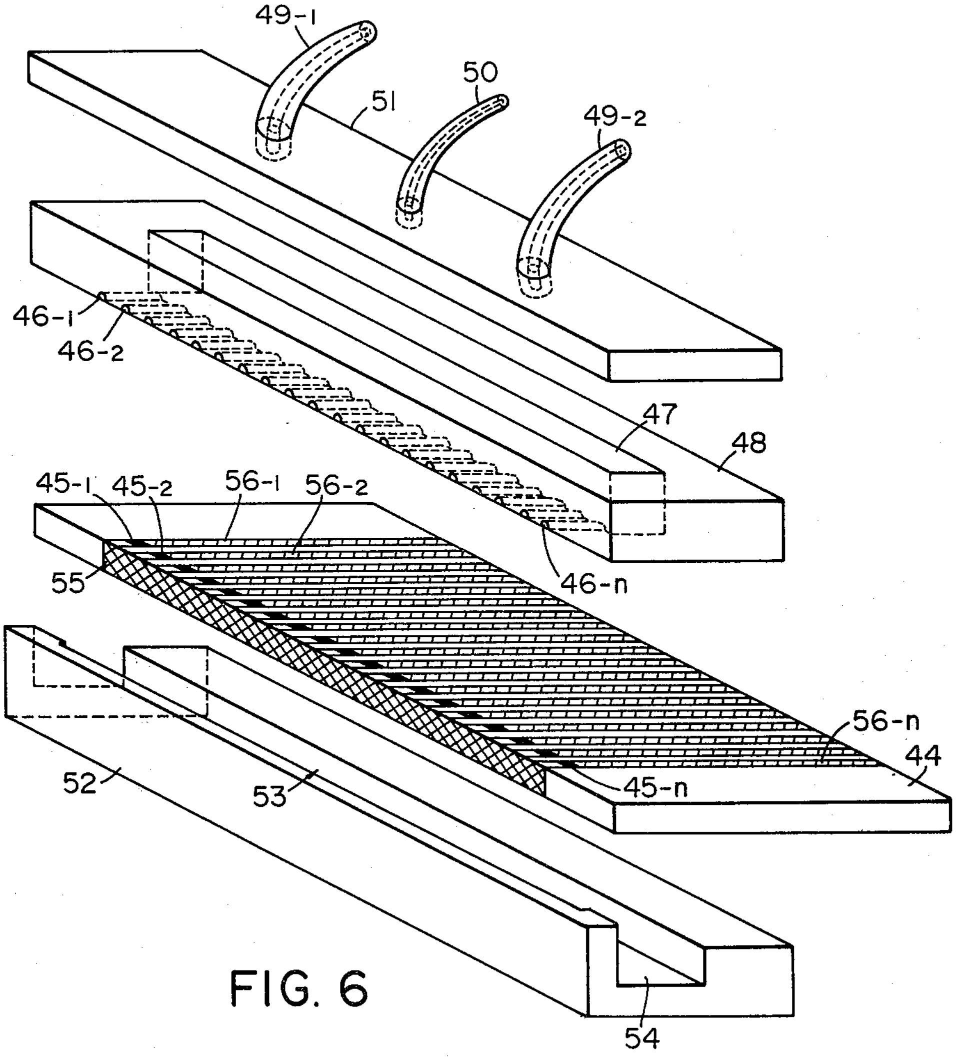

Now, reference is made to FIGS. 4 and 5 showing another embodiment of the present invention, wherein the ink droplet generation is achieved by thermal energy. It is to be understood that the present invention is by no means limited to such embodiment but is also applicable to ink jet recording utilizing ink droplet generation by mechanical energy supplied by a piezo-electric element or by other methods. In the apparatus shown in FIGS. 4 and 5, a substrate 34 having an electrothermal transducer (heating element) 33 is bonded to a plate 36, for example a glass plate, having a groove 35 in such a manner that said groove 35 is positioned above the heating element 33, and the bonded unit is connected to an ink supply pipe 37 and an ink supply tank 38 as illustrated. The ink therein is pressurized with a pressure $P_3$ for example by a piston and a spring, by floating a lid on the ink in the tank 38 and placing a weight thereon or by positioning the ink supply tank 38 above the orifice 39. The pressurizing with a gas bomb or with a pump is also possible, and, in any case the ink is pressurized in such a manner as to have a positive pressure at the orifice 39. In such state the ink leaking from the orifice 39 stays thereon in convex form by the surface tension or drips off along the wall around the orifice. The resulting liquid film around the orifice 39, which hinder droplet ejection, is eliminated by suction into an intake aperture 40 of a slit shape. The optimum suction pressure $P_4$, shape of intake aperture and amount of intake are variable depending on the amount of heating or dripping ink which is in turn dependent on the dimension of the groove 35 and the ink pressure $P_3$. A lateral cover 41 forming said intake aperture is preferably formed thin as the recording material 42 is preferably positioned close (for example a distance of ca0.1 mm) to the orifice 39 in terms of recording. The dimension of said intake aperture 40 is usually in a range of 10 to 500 microns, preferably in a range of 30 to 100 microns, as an excessively large aperture will disturb the atmosphere around the orifice 39 to hinder stable flight of ejected ink droplets while an excessively small aperture will result in insufficient ink suction or in the clogging by the dusts present in the atmosphere. Further, in case the present embodiment is modified into a multi-orifice apparatus as shown in FIG. 6, each suction aperture may be provided corresponding to one orifice but preferably corresponds to plural orifices in consideration of easier manufacture of the recording head. The intake aperture 40 is preferably positioned close to the orifice 39, and the upper end of the intake aperture may be in adjacent with the periphery of the orifice.

In addition, a further stabilized liquid intake is rendered possible by providing a pressure-reduced chamber 43 of a suitable dimension immediately behind the narrow slit of the intake aperture 40, as shown in FIG. 4.

In the foregoing embodiment the liquid intake is achieved by reducing the pressure in the liquid intake unit by a vacuum pump or by utilizing suction by a pressure pump. Said liquid intake can also be achieved by absorption, particularly absorption for example with a blotting paper-like member provide in the vicinity of the orifice in place of the aforementioned intake aperture, though such member has a relatively limited service life and requires regular replacement. The effect of the leaking ink intake can be further enhanced by an ink-repellent treatment around the orifice to prevent the presence of ink drops therearound or by uniform ink-wetting treatment around said orifice.

Now reference is made to FIG. 6 showing an embodiment of the present invention applied to a multiorifice type nozzle. In FIG. 6 the components are shown in the exploded manner for easier understanding of the structure.

An alumina substrate 44 of 60×40 mm in size is sputtered with $SiO_2$ with a thickness of 4 microns, then further sputtered with $HfB_2$ as the heating element and with aluminum as the electrode, and subjected to an etching process to n stripe patterns with a density of 8 lines/mm.

Each of the heating elements 45-1, 45-2, . . . , 45-n is of a size of 40×250 microns and of a resistance of 150 ohms. Separately on a photosensitive glass 48 (trade name: Photoceram) there are formed grooves 46-1, . . . , 46-n of a width of 40 microns, a depth of 40 microns and a length of 5 mm and a common ink reservoir 47 of 55×5 mm by an etching process. An ink reservoir cover 51 is provided with ink supply tubes 49-1, 49-2 and an air-escape tube 50.

An intake plate 52 is provided at the inner walls thereof with a slit 53 of a width of 30 microns and a length of 55 mm, and a reduced-pressure chamber 54 of a dimension of 60×10×5 mm. The above-explained components are bonded together, and the obtained structure is filled with ink. In response to square-wave pulses of 40 V×10 microseconds with a frequency of 2 KHz applied between the common electrode 55 and respective electrodes 56-1, . . . , 56-n corresponding to the image signal, ink droplets are ejected from the groove apertures 46-1, . . . , 46-n to perform recording corresponding to said image signal on a closely positioned recording paper (not shown).

The ink pressure in said common ink reservoir is 0.6 $K-/cm^2$, and the liquid intake is achieved by a vacuum pump connected to both ends of the reduced-pressure chamber 54.

The number of said ink supply tubes 49-1, 49-2 need not necessarily be limited to two as illustrated but can be selected as one or more than two. Also the common ink reservoir 47 may be divided into plural chambers.

Furthermore, the thermal ink ejection employed in the foregoing embodiment may naturally be replaced by ink ejection caused by mechanical vibration for example by piezo-electric elements.

The foregoing embodiment utilizes as ink based on solvents essentially composed of ethanol in which a black pigment is dispersed in a 2% amount.

In the following there will be explained modified embodiments in the vicinity of the orifice and the intake means with reference to the drawings showing the essential part thereof, wherein the components common with those in FIG. 4 are represented by common numbers.

Figure 7:
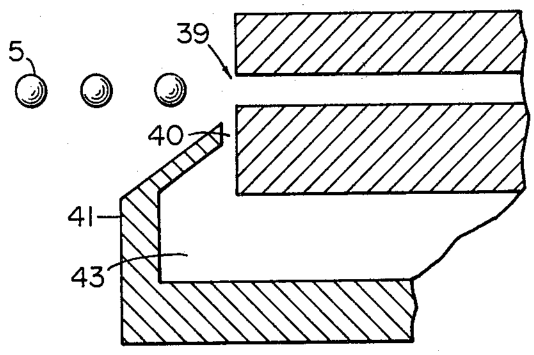

FIG. 7 shows an embodiment in which the slit of the intake aperture 40 is formed narrow and short and is connected immediately therebehind with the reduced-pressure chamber 43 to achieve and improved ink suction effect.

Figure 8:
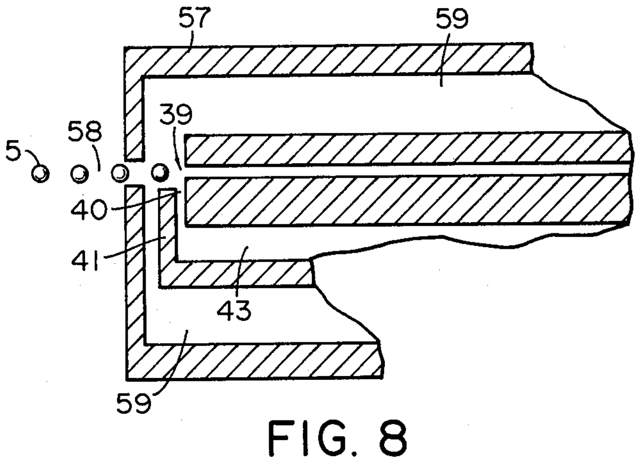

The intake aperture 40 of the present invention, because of the small dimension thereof, may be clogged by dusts present in the atmosphere. FIG. 8 shows, in a lateral cross-sectional view, a modified embodiment for preventing such clogging, in which the apparatus of FIG. 4 is further covered with an outer wall 57 with a gap 59 maintained at a pressure higher than that of the outer atmosphere 58 to prevent the flow thereof into the intake aperture 40. The atmosphere in the gap 59 is filtered and pressurized in advance, and the reduced-pressure chamber 43 in this embodiment is naturally maintained at a lower pressure than in said gap 59.

Figure 9:
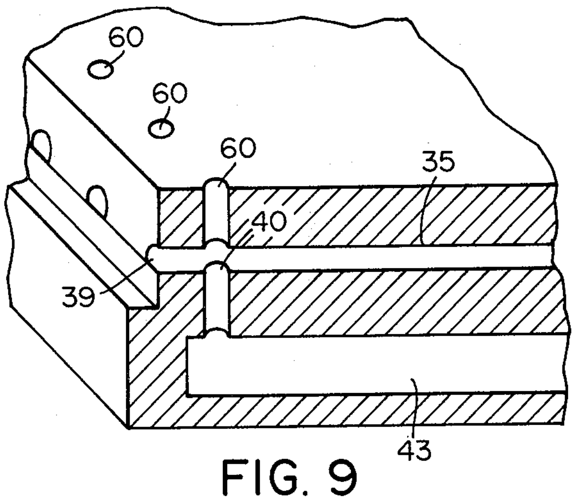

FIG. 9 shows still another embodiment in which the groove 35 and the reduced-pressure chamber 43 are connected by a hole 60 which constitutes an intake aperture at the intersecting section of said hole 60 with said groove 35.

Figure 10:
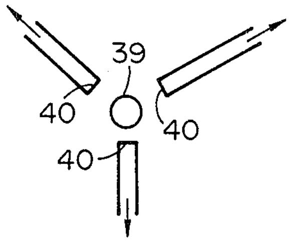
Figure 11:
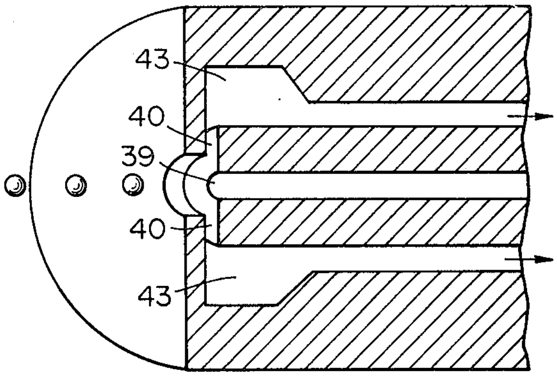
Figure 12:
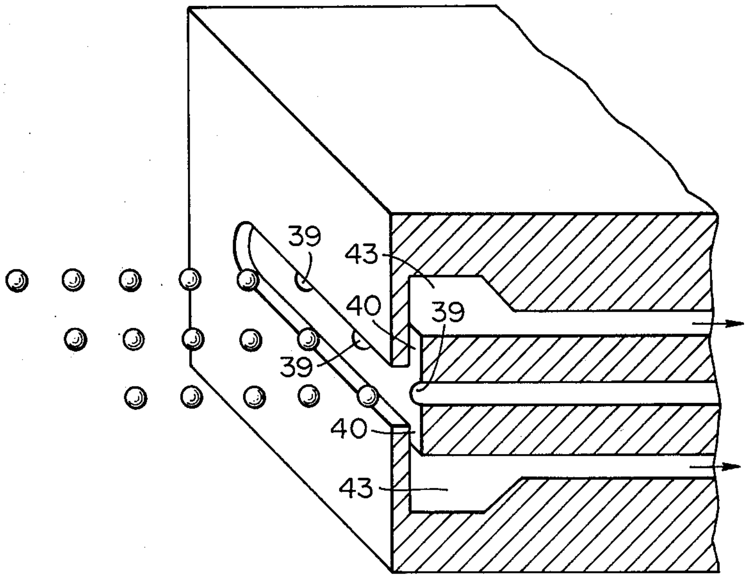

Furthermore, as shown in a schematic front view of the orifice 39 in FIG. 10, said orifice 39 may be provided with plural intake apertures 40 positioned therearound. Furthermore, as shown in FIGS. 11 and 12, the intake aperture 40 may be provided to cover the substantially entire periphery of the orifice 39 instead of covering a part thereof.

In summary the objects of the present invention can be achieved if a liquid intake means is provided in the vicinity of the ink ejecting orifice in such a manner that the ink mass or ink wetting formed by the ink leaking from the orifice can be eliminated or made uniform.

As explained by the foregoing embodiments, the present invention is advantageous in the first place in assuring secure response of droplet ejection even to high-frequency input signal and obtaining substantially constant droplet diameter as long as the input signal remains constant, thereby avoiding omissions in the printing or deterioration in the print quality even in the high-speed recording.

In the second place the present invention allows realization of stable droplet ejection within a short period from the restart of recording operation after a pause, thus ensuring high-quality recording without omission or distortion in the printing even immediately after the start of recording operation.

Figure 13:
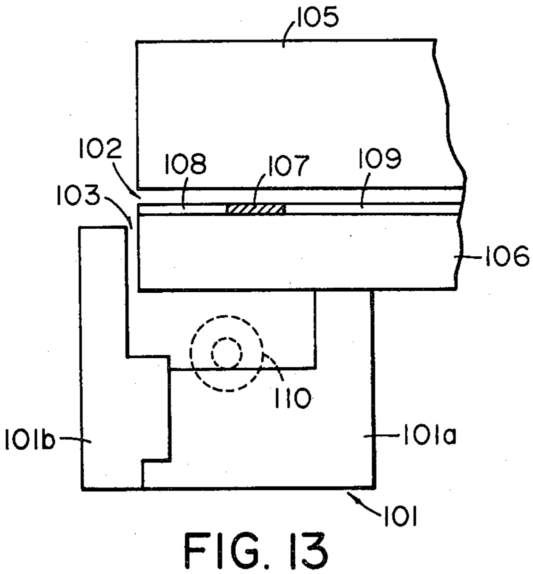
FIGS. 13 to 16 are schematic views showing still other embodiments of the present invention.
Figure 14:
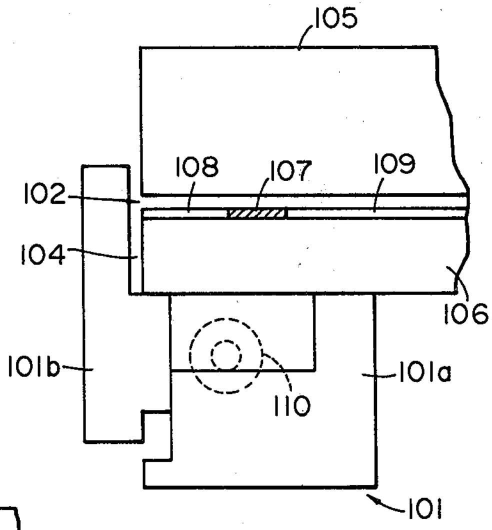

As explained in the foregoing, the ink ejection can be considerably stabilized by continuously removing the ink spontaneously leaking from the orifice by means of the liquid intake means positioned in the vicinity of said orifice. However, in case the apparatus is held out of operation for a prolonged period (for example a whole day), the ink present in the vicinity of the orifice becomes dried to clog the orifice, thereby incapacitating the recording function. However such orifice clogging resulting from ink drying can be completely prevented by further modified embodiments of the present invention, one of which is shown in FIGS. 13 and 14, illustrating the ink ejecting orifice of the ink jet recording apparatus in schematic cross-sectional views. In FIG. 13, an ink intake block 101 is composed of a body member 101*a* and a displaceably attached side plate 101*b*, which is rendered vertically slidable by a drive mechanism (not shown). The ink intake aperture is represented by 103.

When the apparatus is out of operation, the side plate 101*b* is vertically displaced upwards to a position shown in FIG. 14, wherein a small gap 104 formed by said side plate 101*a* in front of the orifice 102 is filled with the ink by capillary action.

The recording operation can be reopened without the clogging of the orifice 102 by returning the side plate 101*b* to the position shown in FIG. 13.

In FIGS. 13 and 14 there are further shown a groove cover 105, a lower substrate 106, a heating element 107, lead electrodes 108, 109 therefor, and the position 110 of ink intake tube.

Figure 15:
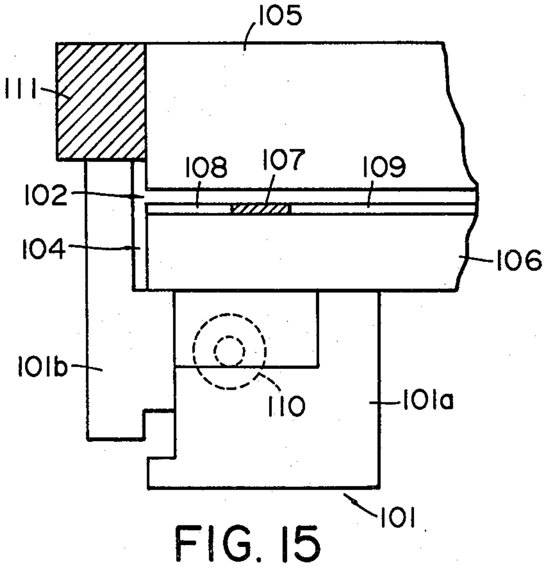

The foregoing embodiment can be further modified as shown in FIG. 15, in which the components common with those in FIGS. 13 and 14 are represented by common numbers. In the embodiment shown in FIG. 15, the groove cover 105 is provided on the front end face thereof with a protruding member 111 formed of an elastic or flexible material such as rubber or plastic material, whereby the side plate 101*b*, upon displacement thereof to the position shown in FIG. 14, comes into close contact with the lower face of said protruding member 111 to form an air-tight channel 104 equivalent to the gap shown in FIG. 14 thereby completely avoiding the ink drying.

Figure 16:
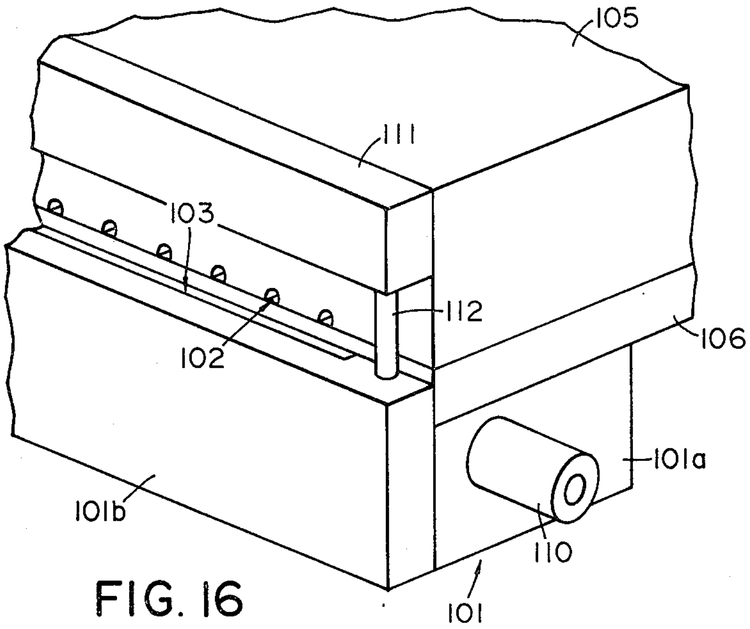

FIG. 16 shows the apparatus of FIG. 15 in a schematic perspective view prior to the displacement of said side plate 101*b*, for which there are preferably provided guides 112 for vertical displacement.

As explained above it is rendered possible by an improvement in the liquid intake means to prevent the ink drying which is the principal cause of the orifice clogging and to constantly maintain the vicinity of the orifice in wet condition. There is involved no danger of causing damage to said vicinity as the orifice is prevented from direct contact with any rigid member.

In general the ink jet recording apparatus should have appropriate measures to prevent possible orifice clogging caused by the impurities or solid matters eventually present in the ink, in addition to that caused by the ink drying as explained in the foregoing.

For this purpose there are already proposed various methods, such as by ink filtering with a filter provided in the ink supply unit, by an ink centrifuge mechanism or by an ink eddy flow.

However, such known methods, though being effective in removing coarse foreign matters larger than the orifice diameter, are practically useless for finer foreign matters and require additional devices, thus complicating the recording apparatus.

According to the present invention such clogging can be very effectively prevented by an embodiment explained in the following.

Figure 17:
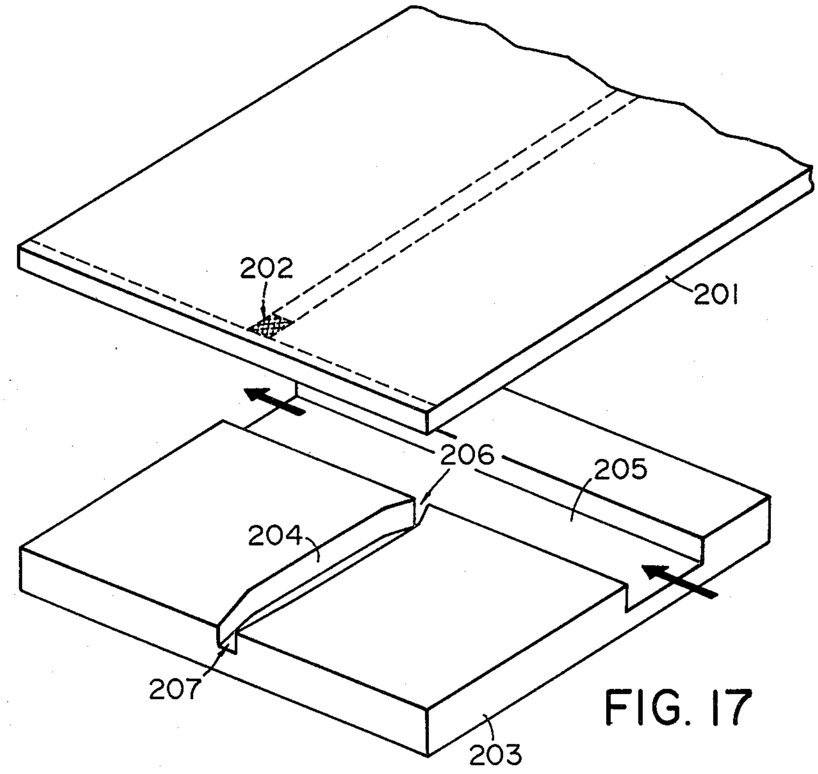
FIG. 17 is an exploded schematic view of still another embodiment of the recording head of the present invention.

FIG. 17 shows, in an exploded perspective view, an ink jet recording head having a preventive measure against such orifice clogging, wherein a substrate 201 for example an alumina substrate is provided with a heating member 202 thereon (at the bottom side in the illustration). Another plate 203, for example made of glass, ceramic material or heat-resistant plastic material, is provided thereon with grooves constituting a drive chamber 204 and an ink reservoir 205, which are connected by an aperture 206 narrower than an ink ejecting orifice 207. The drive chamber 204 has a width approximately corresponding to that of the heating element 202, and the substrate 201 is integrally bonded for example with an adhesive material to said plate 203 so as to position said heating element 202 above the drive chamber 204 thereby completing the recording head.

In the following, we shall explain the working principle of ink ejection from the above-explained recording head. The ink is supplied in the ink reservoir 205 under a suitable pressure in the direction of arrow, and fills the space in the drive chamber 204 through said aperture 206. In response to signals received from outside, the heating element 202 generates heat to transmit the thermal energy to the ink present therearound. Upon receipt of said thermal energy the ink undergoes the volume expansion or a state change such as bubble formation to create a pressure change, which is transmitted in the direction of the orifice 207 to cause the ink ejection from the orifice 207. In the apparatus shown in FIG. 17, the dusts larger than the orifice diameter are unable to enter the drive chamber 204 as the aperture 206 is made narrower than the orifice 207.

Also the constant pressurized ink flow in the direction of arrow eliminates the inpurities eventually present in the vicinity of the aperture 206. Impurities smaller than the aperture 206 and eventually passing therethrough are discharged along with the ink from the orifice 207 without causing clogging as the orifice 207 is evidently larger than such impurities.

The effect of the present invention can be further enhanced by modifications in the junction of the drive chamber 204 and the ink reservoir 205 as shown in FIGS. 18 to 24, showing the principal portion of the grooved plate 203 in a plan view wherein the arrow indicates the direction of principal flow of the supplied ink.

Figure 18:
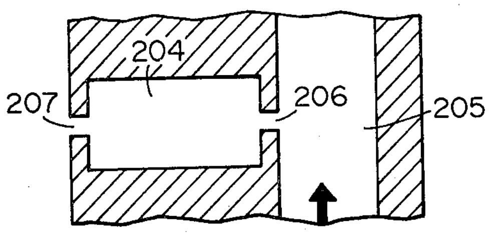
FIGS. 18 to 24 are schematic views showing modified embodiments of the present invention.
Figure 19:
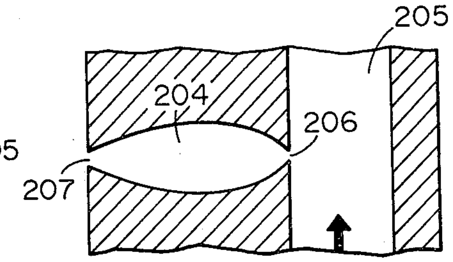

In an embodiment shown in FIG. 18, the orifice 207 and the aperture 206 have the same diameter which is narrower than the drive chamber 204. Such structure is effective for removing the impurities which may cause the clogging of the orifice 207, though it is defective in that the impurities smaller than the aperture 206 may be accumulated in the chamber 204. An embodiment shown in FIG. 19 is improved to eliminate the drawback of the embodiment of FIG. 18 and has a flow line-shaped chamber to achieve smooth ink flow.

Figure 20:
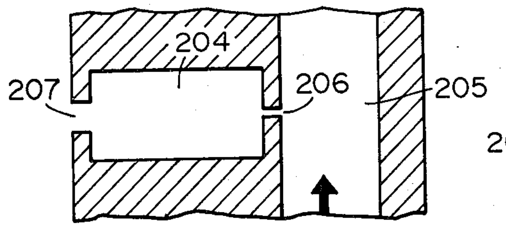

An embodiment shown in FIG. 20 has an extremely small diameter of the aperture 206.

Figure 21:
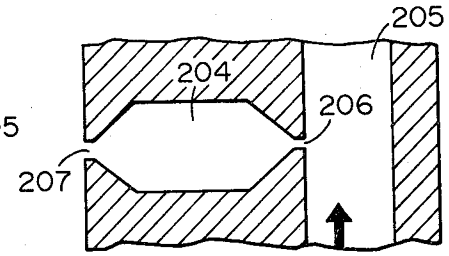

In an embodiment shown in FIG. 21, the inner walls of the chamber 204 in the vicinity of the orifice 207 and the aperture 206 are formed with a certain angle.

Figure 22:
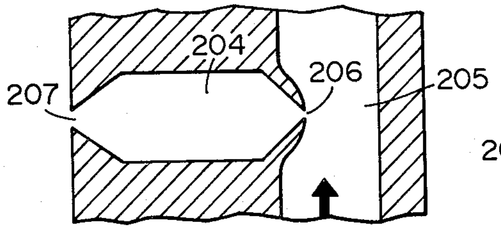
Figure 23:
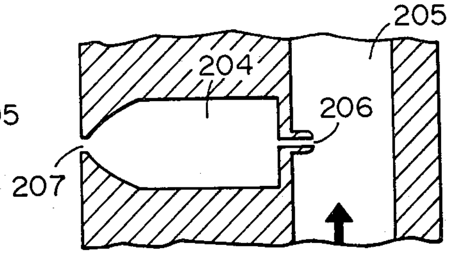

In embodiments shown in FIGS. 22 and 23, the aperture 206 is so particularly shaped as to prevent the entry of the impurities.

Figure 24:
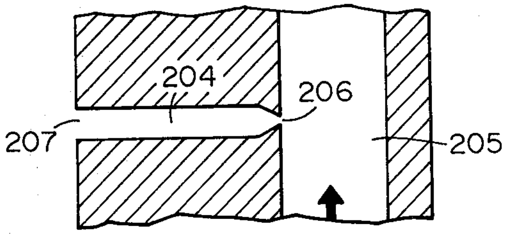

In an embodiment shown in FIG. 24, the aperture 206 alone is shaped narrow while the chamber 24 is formed with a width identical with that of the orifice 207. Also any other structure for example having plural apertures 206 or having different structural details is also included in this embodiment as long as the diameter of the aperture 206 is smaller than that of the orifice, though the inner wall of the chamber 204 is preferably formed with a flow-line shape or suitably angled in order to suppress the accumulation of impurities in the vicinity of the aperture 206 or of the orifice 207.

Figure 25:
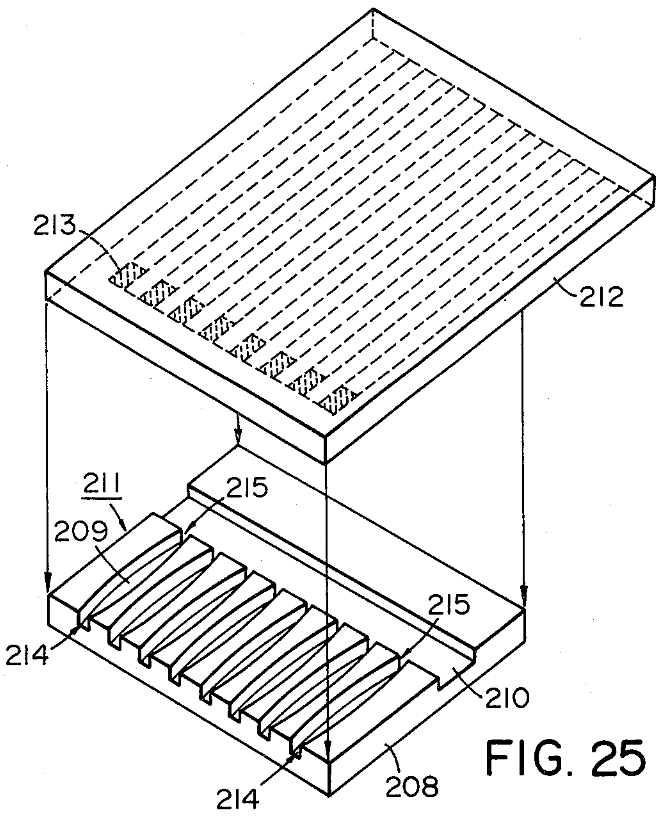
FIGS. 25, 26(*a*) and 26(*b*) are schematic views showing other modified embodiments of the recording head of the present invention.

In the following there will be explained still another embodiment of the present invention suitable for preventing the orifice clogging, said embodiment being explained with an ink ejection experiment conducted with a multi-orifice recording head, of which structure is shown in an exploded view in FIG. 25. A grooved plate 211 composed of a glass plate 208 on which grooves constituting plural drive chambers 209 and a common ink reservoir 210 are formed by etching process is adhered, by means of an adhesive material to be explained later, to a substrate 212 having plural heating elements 213 on the bottom surface thereof in the illustrated manner to obtain a multi-orifice recording head.

Figure 26A:
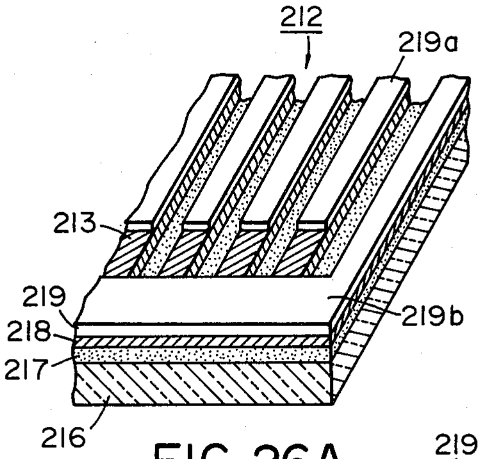
Figure 26B:
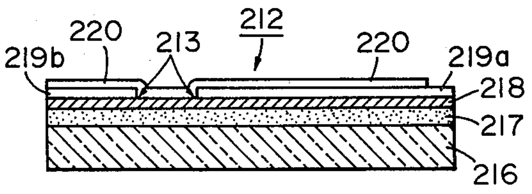

Each chamber 209 is provided with an ejection orifice 214 and is connected to the common ink reservoir 210 through an aperture 215 narrower than said orifice. FIGS. 26(*a*) and 26(*b*) show the detailed structure of said substrate 212, wherein an alumina substrate 216 is overlaid in succession with an $SiO_2$ heat accumulating layer 217 of a thickness of several microns, a $ZrB_2$ heat-generating resistor layer 218 of a thickness of 800 angstroms and an aluminum electrode layer 219 of a thickness of 5000 anstroms, which are then selectively etched to form heat-generating resistors 213 which are 60 microns wide and 75 microns long. Also formed by etching are selecting electrodes 219*a* and a common electrode 219*b*. As shown in FIG. 26(*b*) said substrate 212 having heating elements is provided thereon with an $SiO_2$ protecting layer 220 of a thickness of 1 micron.

The composition of the adhesive is as follows:

Epoxy resin (Epikote #828): 100 parts 4,4'-diaminodiphenyl methane: 30 parts

The ink ejection experiment is conducted with the following conditions:

Pulse width: 10 microseconds

Pulse frequency 10 KHz

Applied energy: 0.01 mJ/pulse/heating element

The ink composition is as follows:

Water: 70 parts

Diethylene glycol: 29 parts

Black dye: 1 part

In a continuous ink ejection experiment conducted under the above-mentioned conditions, the head showed excellent recording performance and durability without any orifice clogging resulting from the impurities contained in the ink.

Although the foregoing embodiments have been explained with respect to a recording system utilizing the ink ejection by thermal energy, it is to be understood that the present invention is by no means limited to such recording system but is also applicable to other systems of the ink jet recording.

As the ink jet recording with a single orifice as explained in the foregoing is inevitably limited in the high-speed recording performance, for the purpose of high-speed recording generally considered advantageous is so called multi-orifice ink jet recording in which multiple orifices are arranged in an array to simultaneously conduct the recording of a width or an area.

However, such an array with high-density arrangement of orifices or recording heads inevitably tends to deteriorate the print quality and therefore requires certain condition. More specifically, said condition can be defined by a maximum arrangement density of orifices given by a value of r/l-r not smaller than $\frac{1}{3}$, wherein l is the distance between the centers of adjacent orifices while r is the distance between the peripheries of adjacent orifices, whereby the collision or union of droplets simultaneously ejected from adjacent orifices is substantially prevented.

On the other hand, in case of a multi-orifice recording head, said value r/l-r should preferably be not in excess of ca. 20 for the purpose of improving the resolution of a recorded image as an excessively large value results in a widened distance between the orifices and a lowered resolution of a recorded image.

The collision of the droplets ejected from the adjacent orifices, leading to the union of the droplets or the change of flight course thereof, is caused principally by the following two reasons.

The first is the dilatation of droplet diameter from the orifice diameter to a value allowing direct contact of the adjacent droplets.

The second is the aberration of the droplet from the ideal trajectory thereof. The flight trajectory of the droplet ideally is a straight line lying on a plane passing through the axis of the orifice and parallel to other trajectories.

In practice, however, the direction of ejection is often different from the ideal flight trajector due to aberration in the orifice direction or uneven ink-wetting state in the periphery of the orifice. Also even if the droplet is ejected along the ideal trajectory, it may be aberrated therefrom during the flight under effect of air flow.

It is therefore extremely difficult to expect that multiple droplets substantially simultaneously ejected from multiple orifices perform flight along the ideal trajectories. However, according to the present invention, there is provided a particular structure for obtaining a high-density array of multiple orifices in consideration of the extent of fluctuation in the droplet diameter and in the flight trajectory of the droplets.

Figure 27:
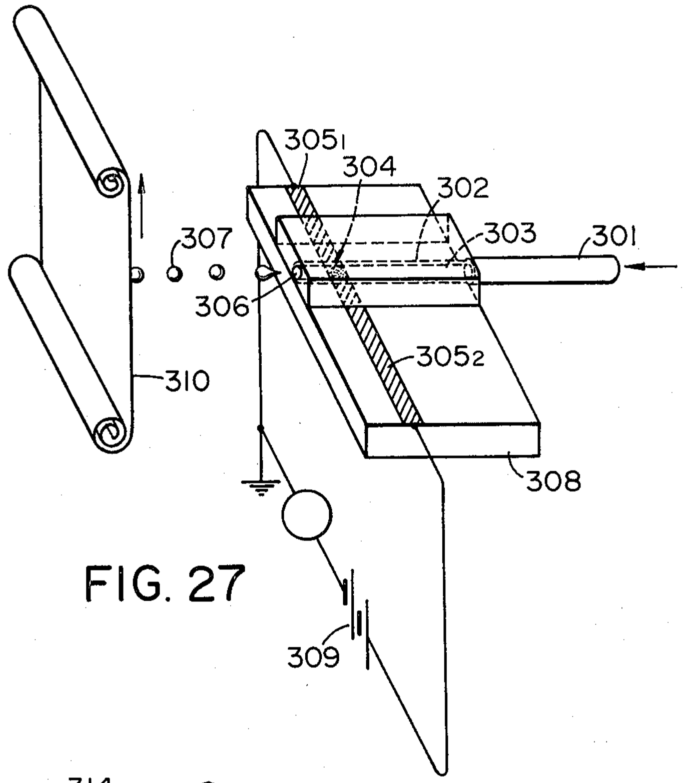
FIGS. 27 and 28 are schematic views of still other embodiments of the recording apparatus of the present invention.

In the following the above-mentioned structure will be explained by an embodiment shown in FIG. 27, wherein there is illustrated a single-orifice recording apparatus for the purpose of simplicity. In FIG. 27, the recording liquid or ink 303 introduced into a liquid chamber 302 from a supply pipe 301 instantaneously cause a state change in response to the heat generated by an electrothermal transducer 304 provided in said liquid chamber 302.

Said transducer 304 is adapted to generate thermal pulse signals in response to electrical signals supplied through electrodes 305-1, 305-2 connected to said transducer. Said recording liquid 303 receives a force caused by the state change thereof, whereby said liquid 303 is ejected in the form of droplets 307 from an orifice 306 and deposited onto a recording material 310 to perform recording.

Said transducer 304 is provided on a substrate 308 and receives the voltage of a power source 309 according to the recording signals to generate heat corresponding thereto, thus forming printing on the recording material 310 by the droplets 307 according to said recording signals.

The dimension or diameter of the droplet 307 ejected from the orifice 306 is determined as a function of various factors, such as the quantity of electrical energy supplied to the transducer 304 as information, conduction efficiency of thermal energy generated by said transducer 304 to the recording liquid 303, converting efficiency of said transducer, diameter of the orifice 306, internal diameter of the liquid chamber 302, distance from the orifice 306 to the transducer 304, force applied to the recording liquid 303, quantity of the liquid 303 receiving said force, and specific heat, thermal conductivity, boiling point, heat of evaporation etc. of said recording liquid 303.

It is therefore easily possible to control the dimension of said droplets 307 by one or more than two of such factors, and thus to perform recording with a desired diameter of spot or droplet.

As the electrothermal transducer 304 in the present embodiment, there can be employed a thermal printing head already widely known in the field of thermal recording. Thermal recording heads are generally classified into the thick-film heads, thin-film heads and semiconductor heads according to the process of preparation and the heat-generating resistor used therein, but the head of any type can be employed in the present embodiment. However preferred is the use of a thin-film head in case of recording with a particularly high speed and resolving power.

The recording liquid to be employed in the present embodiment is principally composed of a solvent such as water, ethanol or toluene in which dispersed or dissolved are a wetting agent such as ethylene glycol, a surfactant and suitable dyes. A filtration step after the preparation of said liquid or the use of a filter in the liquid chamber is similarly effective for preventing the orifice clogging as in the case of ordinary ink jet recording.

Figure 28:
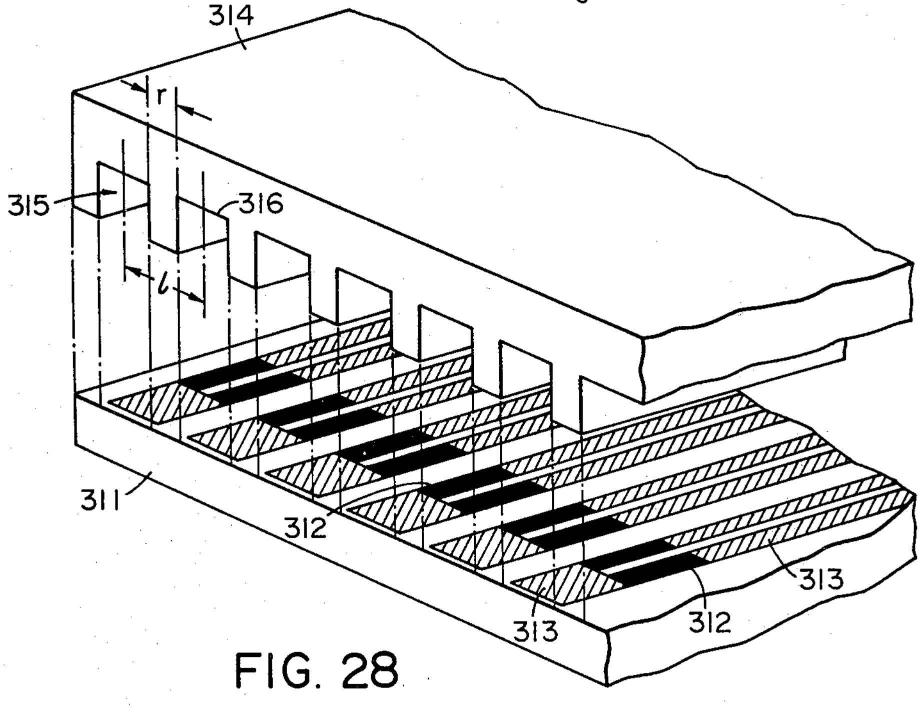

Now reference is made to FIG. 28 showing a multi-orifice array of the present embodiment in a partial exploded view, in which an $Al_2O_3$ substrate 311 formed from minute particles is overlaid in succession with a heat-accumulating $SiO_2$ layer, an $HfB_2$ heater layer and an aluminum electrode layer by a thin-film forming technology, which are then selectively etched to form the pattern as shown in FIG. 28. In order to verify the conditions for the union of ejected ink droplets, the heater 312 was prepared with a width 10, 20, 30, 40 or 60 microns, with a length equal to 1.5 times of said width. The pitch of the heaters was varied as 15, 20 and 15 microns for a heater width of 10 microns; 25, 30, 40 and 50 microns for a heater width of 20 microns; 36, 40, 45, 60 and 75 microns for a heater width of 30 microns; 48, 50, 60, 80 and 100 microns for a heater width of 40 microns; and 72, 75, 80, 90, 120 and 150 microns for a heater width of 60 microns. In this manner 500 heaters arranged in a row were prepared together with the electrodes 313 by selective etching. The above-mentioned substrates, 23 kinds in total, were overlaid with an $SiO_2$ protecting layer on the heaters 312. Separately grooved plates 314 of 23 kinds were prepared by forming, with a semi-conductor chip scriber cutter equipped with thin blades of 10, 20, 30, 40 and 60 microns, square-sectioned grooves 315 matching the above-mentioned heater widths and heater pitches on glass plates, and were adhered with epoxy resin to said substrates 314 to obtain 23 different multi-orifice arrays.

Said arrays were further provided with ink supply chambers and lead wires for heater drive circuits to complete the recording heads. The length of a side of said orifice 316 and the relation to the adjacent orifice are correlated as shown in Table 1.

At first the ejection test was conducted with an array having an orifice side length of 10 microns and an r/l-r value of ½ to record a dot line by simultaneous ejection of ink droplets from all the orifices onto a recording sheet distanced by ca. 1 mm from the orifices, and the ejection was repeated until 200 dot lines were obtained. The inspection of thus recorded dots under a microscope revealed no dot union or no dot distortion resulting from droplet collision during the flight, out of 100,000 dots.

Similar tests were carried out with other arrays, and the number of droplet collisions was determined by the inspection under a microscope and represented in percentage with respect to the total number of emitted droplets in Table 1.

TABLE 1

| (microns) | Orifice side length | | | | |
|---|---|---|---|---|---|
| r/l − r | 10 | 20 | 30 | 40 | 60 |
| 1/5 | — | — | 49.20 | 49.70 | 49.60 |
| ¼ | — | 0.08 | — | 0.12 | 0.93 |
| ⅓ | — | — | 0.01 | — | 0.02 |
| ½ | 0.00 | 0.00 | 0.00 | 0.00 | 0.00 |
| 1 | 0.00 | 0.00 | 0.00 | 0.00 | 0.00 |
| 1.5 | 0.00 | 0.00 | 0.00 | 0.00 | 0.00 |

Note:
l:distance between the centers of adjacent orifices;
r:distance between the peripheries of adjacent orifices The above results indicate that the number of mutual collisions of ejected droplets increases with the smaller value of r/l-r and drastically decreases when said value is equal to or in excess of ⅓. The print quality was satisfactorily high, without distortion, when said value was equal to or in excess of ⅓.

As explained detailedly in the foregoing, the foregoing embodiment allows continuous high-quality recording with stable droplets irrespective of the form of the recording head, when a plurality of ink ejecting orifices are densely arranged, for example with a density of 16 units per millimeter.

The above-explained results are applicable not only to the square-sectioned orifices as illustrated but also to orifices of other cross-sections such as circular orifices.

What we claim is:

1. An ink jet recording apparatus for ejecting a recording liquid in the form of droplets from an orifice communicating with a chamber containing said liquid and depositing at least a part of said droplets onto a recording material to perform recording, comprising liquid intake means outside said orifice and adjacent said orifice to take in the liquid which does not become droplets.

2. An ink jet recording apparatus according to the claim 1, wherein said liquid intake means comprises a slit-formed suction aperture of a gap in a range from 10 to 500 microns.

3. An ink jet recording apparatus according to the claim 1, further comprising an aperture for introducing said recording liquid into said liquid chamber, wherein said orifice and said aperture are so dimensioned that the cross section of said aperture is equal to or smaller than that of said orifice.

4. An ink jet recording apparatus according to the claim 1, comprising plural orifices in a mutually close arrangement.

5. An ink jet recording apparatus according to the claim 4, wherein said plural orifices are arranged in such a manner that a value r/l-r is equal to or in excess of $\frac{1}{3}$, wherein l is the distance between the centers of adjacent orifices while r is the distance between the peripheries of adjacent orifices.

6. An ink jet recording apparatus according to the claim 1, wherein said liquid intake means comprises a suction aperture connected to a reduced-pressure zone.

7. An ink jet recording apparatus according to the claim 6, wherein said suction aperture is formed as a slit.

8. An ink jet recording apparatus according to the claim 6, wherein said suction aperture is rendered displaceable in the vicinity of said orifice.

9. An ink jet recording apparatus for ejecting a recording liquid in the form of droplets from an orifice communicating with a liquid chamber containing said liquid and depositing at least a part of said droplets onto a recording material to perform recording, comprising liquid pressurizing means for pressurizing said liquid in such a manner that said liquid spontaneously leaks out from said orifice and liquid intake means positioned outside said orifice and adjacent said orifice to take in the leaking liquid.

10. An ink jet recording apparatus according to the claim 9, wherein said liquid intake means comprising a slit-formed suction aperture of a gap in a range from 10 to 500 microns.

11. An ink jet recording apparatus according to the claim 9, further comprising an aperture for introducing said recording liquid into said liquid chamber, wherein said orifice and said aperture are so dimensioned that the cross section of said aperture is equal to or smaller than that of said orifice.

12. An ink jet recording apparatus according to the claim 9, comprising plural orifices in a mutually close arrangement.

13. An ink jet recording apparatus according to the claim 12, wherein said plural orifices are arranged in such a manner that a value r/l-r is equal to or in excess of $\frac{1}{3}$, wherein l is the distance between the centers of adjacent orifices while r is the distance between the peripheries of adjacent orifices.

14. An ink jet recording apparatus according to the claim 9, wherein said liquid intake means comprising a suction aperture connected to a reduced-pressure zone.

15. An ink jet recording apparatus according to the claim 14, wherein said suction aperture is formed as a slit.

16. An ink jet recording apparatus according to the claim 14, wherein said suction aperture is rendered displaceable in the vicinity of said orifice.

* * * * *

UNITED STATES PATENT AND TRADEMARK OFFICE

CERTIFICATE OF CORRECTION

PATENT NO. : 4,317,124

DATED : February 23, 1982

INVENTOR(S) : YOSHIAKI SHIRATO, ET AL.

It is certified that error appears in the above—identified patent and that said Letters Patent is hereby corrected as shown below:

Column 4, line 29, "being" should be --are--;
line 38, "stabilize" should be --stabilizing--.

Column 5, line 41, after "be" delete "in".

Column 6, line 38, after "utilizes" delete "as".

Column 10, line 60, "trajector" should be --trajectory--.

Column 11, line 53, after "However" insert --,--.

Claim 10, line 2, "comprising" should be --comprises--

Claim 14, line 2, "comprising" should be --comprises--

Signed and Sealed this

*Twenty-ninth* Day of *June 1982*

[SEAL]

*Attest:*

GERALD J. MOSSINGHOFF

*Attesting Officer* *Commissioner of Patents and Trademarks*